United States Patent [19]

Moyer et al.

[11] Patent Number: 4,850,029
[45] Date of Patent: Jul. 18, 1989

[54] ADAPTIVE THRESHOLD CIRCUIT FOR IMAGE PROCESSING

[76] Inventors: Alan L. Moyer, 23 Clarissa Rd., Chelmsford, Mass. 01824; Vincent J. Messina, LaBlanc Rd., Pelham, N.H. 03076

[21] Appl. No.: 754,685

[22] Filed: Jul. 15, 1985

Related U.S. Application Data

[63] Continuation of Ser. No. 474,376, Mar. 11, 1983, abandoned.

[51] Int. Cl.$^4$ ............................................. G06K 9/38
[52] U.S. Cl. ........................................ 382/52; 382/53
[58] Field of Search .................... 382/52, 53; 358/282, 358/283, 284

[56] References Cited

U.S. PATENT DOCUMENTS

| | | | |
|---|---|---|---|
| 4,064,484 | 12/1977 | Mese et al. | 382/52 |
| 4,205,341 | 5/1980 | Mitsuya et al. | 358/282 |
| 4,351,004 | 9/1982 | Choate et al. | 382/53 |
| 4,468,704 | 8/1984 | Stoffel et al. | 382/52 |

Primary Examiner—David K. Moore
Assistant Examiner—Jose L. Couso

[57] ABSTRACT

An adaptive threshold circuit is disclosed wherein reflectance values are measure D in each of a number of scan lines on a document on which an image is scanned, digitized at a multiplicity of points and processed to create a processed digitized image signal that is stored or transmitted and then used to recreate the document accurately without objectional light and dark variations over the recreated documents and without being affected by the background color of the original document, variations in illuminating and the black/white makeup of the image. The unprocessed digitized data is first used to calculate a mean value of the digitized reflectance values for each of a number of columns on the document. The same data is then used to calculate a mean-above-mean value for the same columns. Each digitized reflectance value is compared to the mean value and only when it exceeds the mean value is the mean-above-mean value updated. A threshold value is then calculated for each column using the updated mean above mean values for a particular column and for the two contiguous columns. At the same time the most recent threshold value for each column is compared to each unprocessed digitized reflectance value taken in the associated column and values above the threshold value are assigned a first binary value indicating the sample is white and values equal to or below are assigned the opposite binary value indicating the sample is black.

7 Claims, 2 Drawing Sheets

| SAMPLE | 1 | 2 | 3 | 4 | 5 | 6 | 7 | 8 |
|---|---|---|---|---|---|---|---|---|
| $P_n > m$ | 0 | X | 0 | X | X | 0 | X | X |
| $S_2$ | 1 | 1 | 1/2 | 1/2 | 1/4 | 1/8 | 1/8 | 1/16 |
| $S_1$ | 1 | 1/2 | 1/4 | 1/8 | 1/16 | 1/32 | 1/64 | 1/128 |

SECTION $P_n < m = 0$ $P_n > m = X$

ADAPTIVE THRESHOLD CIRCUIT FOR IMAGE PROCESSING

The present is a continuation of U.S. patent application Ser. No. 474,376 filed Mar. 11, 1983 by Alan L. Moyer and Vincent J. Messina for an ADAPTIVE THRESHOLD CIRCUIT FOR IMAGE PROCESSING, subsequently abandoned.

FIELD OF THE INVENTION

This invention relates to digital coding apparatus used in digitizing images on a document for reproduction, storage and/or transmission to recreate the document.

BACKGROUND OF THE INVENTION

In facsimile systems a document containing images or indicia such as printed information is illuminated, scanned, and light reflected or transmitted from the scanned document is detected creating an analog electrical signal which is processed to determine if portions along a scanned path are black or white in order to distinguish between the background of the document and the indicia contained thereon. In digital facsimile systems documents are scanned and digitized and binary decision logic is usually employed to determine a threshold level between black and white used for converting the analog signal output from the scanner to a two level binary signal wherein each level corresponds to black or while detected reflections from portions or pixels of the scanned document. It is known that such detected reflections from a scanned document vary widely not only from sheet to sheet but also from portion to portion on a document. The magnitude of the signal generated by a photo detector in scanning a document is a function of the light reflected from the scanned document. In addition to variations in reflectivity or transmissivity (i.e., optical density) from desirable parts of an image, the signal amplitude is also influenced by variations in document illumination, smudges, document background colors, defects in the image itself, and variations in the sensitivity of the photo detectors. Accordingly, it is necessary to extract the desired components in the analog signal due to image content and to supress the undesirable, abovementioned variations from the analog signal. This separation is generally accomplished by establishing a threshold value against which the reflected signal is compared. The result of the comparison is a binary decision such that whenever the reflectance value exceeds the threshold one color, e.g. white, is selected and, conversely, where the threshold is not exceeded, the opposite color, e.g. black, is selected. The binary decision is represented by a zero or a one for a number of sample points or pixels on a document.

It has been found useful to provide threshold values that vary so as to be representative of the average reflectance value in a small region in the vicinity of a picture element for which a black/white decision is being made. The prior art teaches numerous ways of adjusting the threshold of the circuitry which makes the decision if a scanned element is either black or white. U.S. Pat. No. 4,351,004 observes a few pixels on either side of a pixel of interest along a scan line. The analog signal representing the reflection off of a document for the pixels on either side of a pixel of interest are summed across a summing resistor and the resultant sum value is used to adjust the threshold used in analyzing the reflection from the pixel of interest. The problem with this technique is that if there is a lot of black material in the image on the document, or the background of the document itself is colored the overall reflection decreases and the variable threshold derived utilizing this technique is shifted and can thereby cause erroneous black-white decisions. In addition, this technique only observes pixels on either side of the pixel of interest along a scan line. There is now way to take into account the nature of the document or the image on the document in the area above and below each pixel.

U.S. Pat. No. 4,345,314 teaches a technlque in which analog signals for 2,048 pixels in scan line must be digitized and stored. In addition, 2,048 vertical reference values must be stored. Thus, in excess of four thousand 8-bit binary words must be stored for analyzation to adjust the threshold level used in making the black-white decision for each pixel. The technique described consists of a two-dimensional low pass filter which is used to estimate only the mean reflectance value in areas near the pixels to be thresholded. As such, the technique is sensitive to the percentage of indicia in the document which is an undesirable feature. This technique requires a large amount of memory to implement.

U.S. Pat. No. 4,247,873 teaches a technique in which a peak detector is utilized to detect the peaks of analog signals representing light reflected from the document. The analog signals are integrated by charging a capacitor from which the charge is dissipated across one of two parallel resistors. A very slow decay rate is implemented by a large value resistor when the overall reflected light level from a scanned document is high, and a higher discharge rate is implemented by placing a smaller value resistor in parallel with the capacitor when the overall reflectivity from the document is lower. The effect of the smaller value resistor in parallel with the capacitor is to lower the voltage across the capacitor. It is this voltage across the capacitor which is representative of the threshold voltage. Thus, the threshold goes up as the overall light reflected from a document during scanning is higher, and the threshold value goes down when overall reflected light is lower. A comparator is then used to compare an analog signal representative of the light reflected from a particular sample point or pixel being scanned with the threshold level to determine if the particular pixel is black or white. The shortcomings of this technique are that dark areas of width larger than about ten pixels may be classified erroneously as white. In addition, since there is no line to line filtering of the calculated thresholds, nonuniformities in character stroke widths will be evident in the output.

While the above cited prior art teaches a variety of ways of implementing an adaptive threshold for processing signals representing images on a document, all these techniques have one or more problems which are solved by our invention.

SUMMARY OF THE INVENTION

Utilizing our novel adaptive threshold technique for processing signals representing images or indicia on a scanned document we are able to solve the above problems and shortcomings found in prior art facsimile equipment. We can utilize a relatively simple lighting arrangement and the scanning equipment and lights may be moved vertically relative to the document to allow changes in magnification without affecting the quality of the document reproduced. Our novel technique requires little memory but different areas of a document are treated separately regarding adpative thresholding. The threshold for each area need not be redetermined each time an area is scanned, but is stored between scans of each area and is updated each time an area is scanned.

We scan a document to read the images or indicia thereon and then digitize the analog signal obtained by the use of an analog to digital converter. The result is a series of binary numbers each representing a point or pixel on the document. The binary numbers representing pixels in each area, which advantageously are a plurality of columns on the document, are processed as they are generated during scanning and digitizing using an averaging type technique to compute a mean value for each column area as the column is being scanned. The mean values computed for each column are stored as other columns are being scanned and digitized. These mean values are updated with new binary numbers obtained each time a column is rescanned.

The same binary numbers representing pixels in each column are also processed as they are generated to compute a mean-above-mean value for mean peak value for each column which indicates the signal level corresponding to white on the document. Thereafter, the mean peak value for each column is used to calculate a threshold value for each column. More particularly, the mean peak value for a specific column is used in conjunction with the mean peak value for the contiguous columns to calculate the threshold value. The threshold value for each column is updated each time the given column is rescanned for subsequent scan lines across the document. In this manner accurate threshold values are determined.

The updated mean value for each column is compared to the value of each binary number representing a pixel scanned in the corresponding column and when the value of a binary number exceeds the updated mean value the mean peak value for the same column is updated. When the value of a binary number representing a point in an column does not exceed the updated mean value the mean peak value for the column is not updated.

The updated threshold value for each column is compared to each binary number representing each pixel in the same column. When the threshold value exceeds the value of a binary number a first state of a two state signal is generated. When the threshold value is less than the value of a binary number the opposite value of the two state signal is generated. More specifically, these two states are the zero and one of a binary signal with the one state representing a white pixel on the document and the zero state representing a black pixel on the document. Our technique is disclosed herein functioning with a facsimile system wherein a document is scanned and digitized and the digital signal is processed in accordance with the teaching of our invention to create a processed digitized image signal which may be transmitted or stored for later transmission, but either way the original document is recreated accurately. Our novel technique may also be utilized in any application where a document is scanned and digitized to improve the signal representing the scanned document.

BRIEF DESCRIPTION OF THE DRAWING

Our invention will be better understood upon reading the following detailed description in conjunction with the drawing in which.

DETAILED DESCRIPTION

Figure 1:
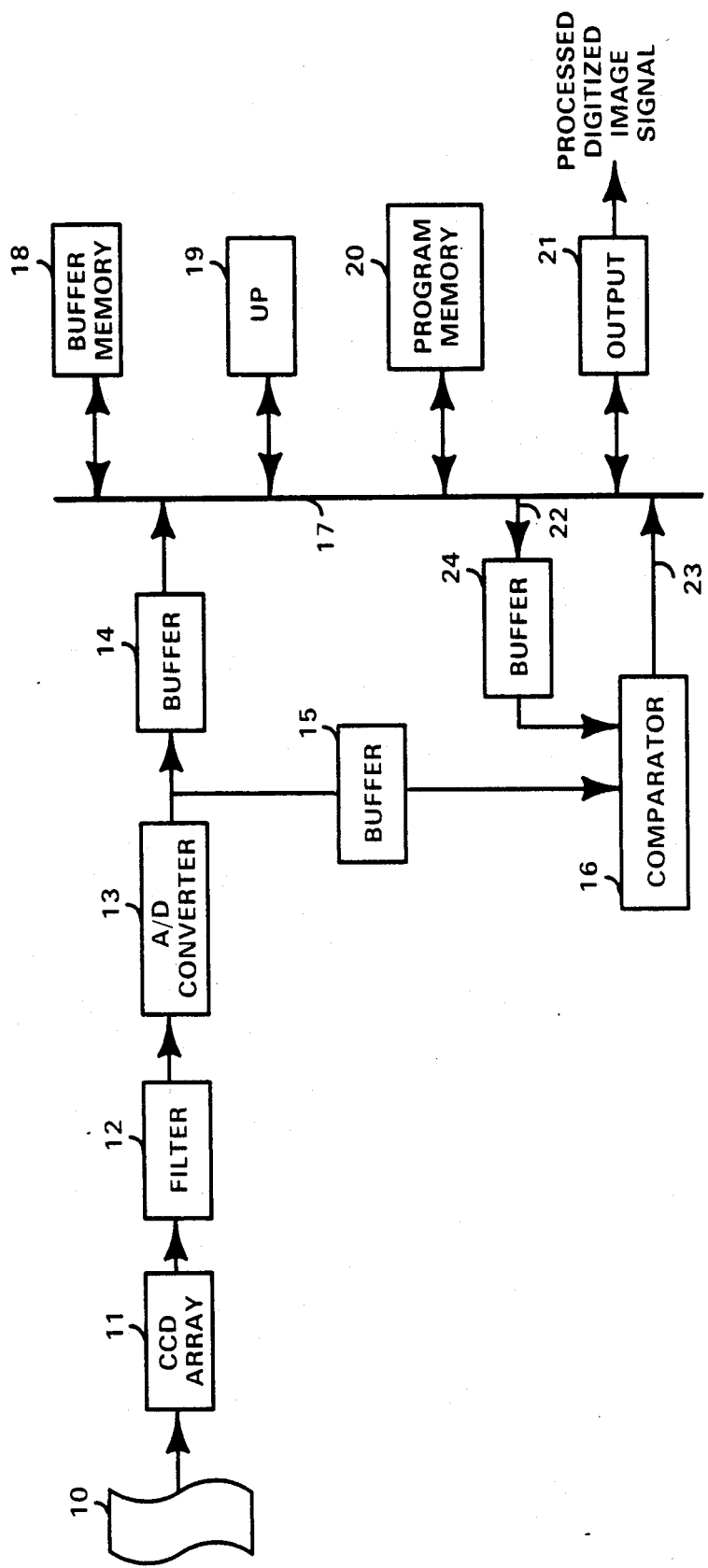
FIG. 1 is a block diagram representing the preferred embodiment of our invention.

FIG. 1 shows a block diagram of the adpative threshold circuit 1, and is the preferred embodiment of our invention. The adaptive threshold circuit 1 derives the following values to be explained infra: the mean, mean-above-mean (or mean peak), threshold and processed digitized image. This embodiment is utilized in a facsimile system to process digitized signals from a scanner representing a document to derive a processed digitized image signal which may be transmitted to a remote location and thereat used to construct an accurate copy of the document that is being transmitted utilizing the facsimile equipment. Our invention may also be used in other applications wherein a document is scanned and a digital signal is obtained representing the document to be used for some purpose. For example, in such applications as copiers and laser printers.

In FIG. 1 element 10 represents a document on which is an image or other indicia (not shown) which most likely will be alphanumeric characters. A scanning device 11 is utilized to scan document 10 to create an analog signal representative of the image or other indicia thereon. In this embodiment of our invention scanner 11 is a charge coupled device (CCD) array such as taught in U.S. Pat. No. 4,351,004 which is incorporated herein by reference. CCD array 11 has a plurality of elements located in a row across the width of document 10. Each of the plurality of CCD elements is responsive to light to generate an analog signal output corresponding to the intensity of the light impinging thereon by means of the imaging lens. Circuity is provided, with CCD array 11 as described in U.S Pat. No. 4,351,004 which is used to periodically and cyclically read individual ones of the CCD elements in array 11. This creates a scanning action to scan document 10. In this manner document 10 is scanned creating an analog signal output from array 11 representative of the image or other indicia on document 10. The analog signal output from array 11 is applied to and conditioned by filter 12 which is a low pass filter made up of a resistor and capacitor network coupled to an operational amplifier as is well known in the art. The analog signal output from filter 12 is then applied to analog-to-digital converter 13 which, in a manner well known in the art, periodically samples the analog signal and generates binary numbers representative of the amplitude of each sample of the analog signal. Each sample is termed a pixel in the art. Thus, during scanning of document 10 binary numbers are output from converter 13. Each of these binary numbers is stored only one at a time in both buffer storage circuits 14 and 15. The output of buffer 14 is connected to bus 17 and binary numbers stored in buffer 14 are read out therefrom by microprocessor 19. Microprocessor 19 operates under control of a program stored in program memory 20 to process the digitized signals to produce a two level signal that is a binary signal representing the image or other indicia on document 10. The processed digitized image signal is output via output circuit 21. While not shown in FIG. 1 the signal output from circuit 21 is forwarded to a remote location via a transmission facility to recreate a facsimile of document 10 at the remote location. In the alternative, the signal output from circuit 21 may be stored for later transmission or for recreating the document locally.

Microprocessor 19 utilizes the digitized signals input to it via buffer circuit 14 to derive a variable threshold signal, which is described in greater detail hereinafter, and the variable threshold signal is applied via bus 17, leads 22, and temporarily stored in buffer circuit 24 to be applied to one of two inputs of comparator 16. As mentioned herein above each of the binary signals output from analog-to-digital converter 13 were also individually stored in buffer circuit 15. Comparator 16 compares each binary number momentarily stored in buffer circuit 15 with the variable threshold signal in binary word form stored in buffer circuit 24. When the value of the variable threshold signal is greater than or equal to the value of the binary number stored in buffer circuit 15, the output from comparator 16 on lead 23 to bus 17 is a binary one which indicates that the scanned point represented by the binary number presently stored in buffer circuit 15 is black. Conversely, when the variable threshold value is determined by comparator 16 to have a value less than the binary number momentarily stored in buffer circuit 15 a binary zero is output on lead 23 from comparator 16 indicating that the scanned point represented by the binary number presently stored in buffer circuit 15 is white. Thus, there is a string of binary zeros and ones output from comparator 23 on lead 23 which is the processed digitized image signal that is output via output circuit 21. Details of the processing of the binary numbers input to microprocessor 19 to create the variable threshold signal applied to comparator circuit 16 is described immediately hereinafter.

Microprocessor 19 processes the digitized document information input to it via buffer circuit 14. Before describing the details of this processing, however, we first describe the layout of the document for scanning and the minimal memory requirements created by our novel mode of processing the digitized signals.

Figures 2, 3:
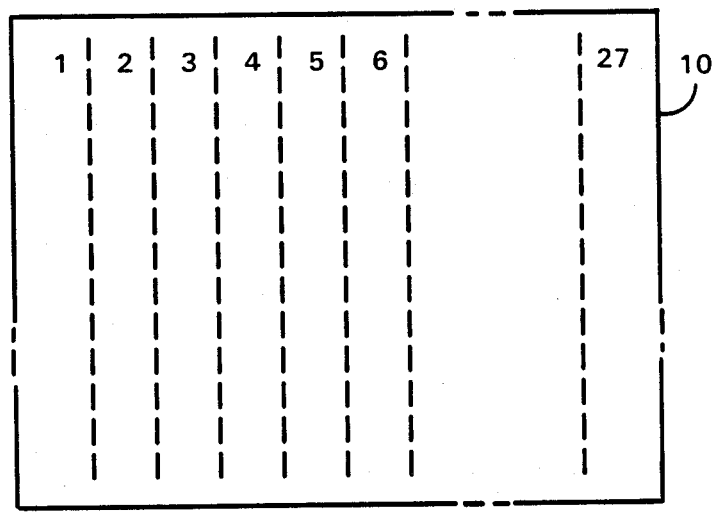
FIG. 2 is a representation of how a document is broken up into a plurality of columns in implementing our invention.
FIG. 3 is a table useful in understanding updating of mean peak values used in determining our adaptive threshold.

In FIG. 2 is shown the layout of document 10 utilized in our signal processing technique. Document 10 is divided into a total of twenty-seven columns of equal width. CCD array 11 extends across document 10 orthogonal to the twenty-seven columns just referred to. Array 11 has 1,728 CCD detector elements which are sequentially read out in a time division multiplexing mode to scan a line which covers the breadth of document 10. The 1,728 CCD elements are divided into twenty-seven groups of 64 elements. Each of these twenty-seven columns has four multi-bit words of memory associated with it for a total of 108 words of memory. The four word locations in memory associated with each of the twenty-seven columns are used to store a "mean" value of the analog signal output from CCD array 11, a "mean-above-mean" or mean peak value of the same analog information, a "current mean gain constant", and a "current mean-above-mean gain constant". The two constants are utilized in the processing steps described further in this specification to calculate the mean and the mean peak values. These values and the constants are calculated for each of the twenty-seven columns on document 10 and then are updated for each scan line across document 10 to achieve the adaptive threshold function provided by our novel invention. If processor 19 can't calculate the values and constants for each line, mean values may be calculated say on odd scan lines and mean peak values calculated on even scan lines. The mean and mean peak values are stored and updated for each of the twenty-seven columns to follow changes both horizontally and vertically on document 10.

Although we have mentioned that CCD array 11 has a total of sixty-four elements for each of the twenty-seven columns of document 10 only the output of every eighth element is utilized in this particular embodiment of our invention. This is merely constrained by the operating speed of microprocessor 19 and those skilled in the art may use multiple processing or faster processors to process more samples. In this embodiment of our invention, using the output of every eighth element of CCD array 11 does not degrade the performance of our invention. With our mode of processing the document is digitized and the information is processed on-the-fly so that little memory is required. Since only a small amount of memory is required buffer memory 18 is not a separate memory from microprocessor 19 but, in reality is a small amount of memory available within the microprocessor chip.

Microprocessor 19 processes the digitized document information input thereto to first derive a psuedo average or mean of the signal utilizing equation (A) immediately hereinbelow $$M_{n,i} = M_{n-1,i} + S_{1,i}(P_{n,i} - M_{n-1,i}) \tag{A}$$

Equation (A) represents a digital filter having one pole with unity gain an a bandwith determined by the value of $S_{1,i}$. Equation (A) utilizes the binary number representing the amplitude of the light reflected from each sample point or pixel on document 10 as $P_{n,i}$ and utilizes the mean value ($m_{n-1,i}$) derived for the previous one of the eight pixels within each column on document 10. $S_{1,i}$ is the "current mean gain constant" which is one of the four multi-bit binary words stored for each of the twenty-seven columns of document 10. Initially $S_{1,i}$ is assigned a value of one and is then decreased to a value of 1/128 over the eight pixels of each column of the first scan line. The resulting time-varying filter is initially wide-band low-pass filter. As $S_{1,i}$ decreases it changes to a narrow-band low-pass filter. This allows the scanning function to start with the white background at the edge of a document and then proceed during scanning to the black images or other indicia which are usually alpha-numeric characters. The digital filter represented by equation (A) is not a true averaging technique but it does average out the mean by considering the natuze of the document around each pixel and thereby prevents fluctuations in the reproduced document which are objectionable. Starting at the beginning of scanning of the first scan line of a document the value of $S_{1,i}$ in equation (A) is given the value of one for the first pixel. This value of $S_{1,i}$ is initially utilized for the mean calculation using equation (A) for the first pixel of each of the twenty-seven columns along the first scan line. For each subsequent pixel the value of $S_{1,i}$ is halved, such that for the second pixel $S_{1,i}$ equals ½, for the third pixel $S_{1,i}$ equals $\theta$, and so on to the eighth pixel in section i for which $S_{1,i}$ equals 1/128. For the second and subsequent lines $S_{1,i}$ equals 1/256 for all pixels in all columns and this value for $S_{1,i}$ that is maintained over the remainder of the document. $S_{1,i}$ is the current mean gain constant which is stored in one of the four words in memory associated with column i.

On the first scan line for the first pixel of each of the twenty-seven columns, in utilizing equation (A) there is no previous mean value for a previous pixel so $m_{n-1,i}$ equals zero while $S_{1,i}$ equals one. Accordingly, $m_{n,i}$ equals $P_{n,i}$ where $P_{n,i}$ is the digital value of the reflected light from the document. For the next pixel of each column in the first scan line $m_{n-1,i}$ is therefore equal to the just mentioned $P_{n,i}$ which is now designated $P_{n-1,i}$. In placing these values into equation (A), for the second pixel $m_{n,i}$ equals $\frac{1}{2}P_{n-1,i}+\frac{1}{2}P_{n,i}$. Carrying the analyzation of equation (A) to the third pixel the value of P for the first sample is $P_{n-2,i}$ and the value of P for the second sample is now $P_{n-1,i}$. According the third pixel in each column $m_{n,i}$ equals $\frac{3}{8} P_{n-2,i}+ \frac{3}{8}P_{n-1,i}+\frac{1}{4}P_{n,i}$. Thus, it can be seen that equation (A) performs its psuedo averaging technique to derive the mean value "m" by adding in only a fraction of the reflectance from each pixel into the summation. The filter has the effect of weighting the most recent pixels most heavily (exponential weighting).

Using equation (A) we are continuously updating the mean value "m" for each of the twenty-seven columns of document 10 using the digitized reflectance value $P_{n,i}$ for each pixel. After updating the mean value "m" over eight samples for each column the mean value at that point in time is stored in one of the four words of memory assigned to each of the twenty-seven columns. As scanning takes place for the next scan line twenty-seven columns of document 10 are again scanned and whatever mean value was previously stored for each column is used for $m_{n-1,i}$ for the first pixel. Thus the mean value for each column is again updated for each of the eight samples in each column and the new updated mean value is again stored in memory. Thus, the mean value "m" for each of the twenty-seven columns is continuously updated as an entire document is scanned.

After an updated mean value is calculated for each column the next step performed by microprocessor 19 is to compare the updated mean value with each reflectance value $P_{n,i}$ in the associated column. Only in the event that the reflectance value $P_{n,i}$ is greater in value than the current updated mean value, does microprocessor 19 go to the next calculation step to calculate an updated value for a mean-above-mean or mean peak value of the digitized data. When the opposite condition occurs on comparison nothing is done. This comparison of the digitized reflectance value $P_{n,i}$ for each document sample point or pixel to the digitized udated mean value is done to take into account many factors including the background of document 10 being colored and there being a large quantity of colored or black image or indicia on document 10. The effect of these factors is to decrease the mean value derived utilizing equation (A). Conversely, with a white document background and with little indicia or image thereon the mean value increases closer to the white level. Accordingly, when the mean value increases closer to the white level it is harder for the facsimile or other equipment to determine exactly what is white and what is black on the document being scanned to be recreated using the facsimile process. Accordingly, we calculate the mean-above-mean or mean peak value using equation (B) to find the white peaks of the signal output from CCD array 11 so that the equipment may properly determine what is white and what is black on the document.

The mean-above-mean or mean peak value of the digitized document signal is derived using equation (B) immediately herein below $$mam_{n,i} = mam_{n-1,i} + S_{2,i}(P_{n,i} - mam_{n-1,i}) \tag{B}$$

It will be noted that equation (B) is similar to equation (A). A current mean-above-mean (mam) value is calculated using the previous value of mam, a value $S_{2,i}$ and the present digitized value of reflectance $P_{n,i}$ from the document during scanning. As previously mentioned the value of mam is not calculated for each pixel of the document but is updated only when $P_{n,i}$ is greater than $m_{n,i}$. Equation (B) is also for a digital filter having one pole and unity gain with a bandwidth determined by the value of $S_{2,i}$.

In FIG. 3 is seen a table which facilitates a better understanding of when the value of mam is updated. FIG. 3 shows a total of eight columns which represent the eight samples or pixels within each of the twenty-seven columns across a document. The th1rd row of FIG. 3 is designated $S_{1,i}$ and reflects the values of $S_{1,i}$ used in equation (A) for the first scan line and for each of the eight samples in each of the twenty-seven columns. The first line of FIG. 3 represents the comparison of the reflectance value $P_{n,i}$ to the mean value "m" calculated using equation (A). The second row of FIG. 3 represents the values of $S_{2,i}$ utilized in equation (B). Initially, $S_{2,i}$ has a value of one. When $P_{n,i}$ is greater than the mean value "m" for a pixel an "X" is shown in the first row of FIG. 3 and when $P_n$ is less than or equal to "m" a zero is shown. Thus, for samples 2, 4, 5, 7, and 8 $P_{n,i}$ is greater than the mean value "m". Note that when $P_{n,i}$ is greater than the mean value "m" that the value of $S_{2,i}$ does not change for that particular sample but changes for the calculation of mam for the subsequent pixel. With the samples shown in the table of FIG. 3, $S_{2,i}$ has only decreased to a value of 1/16 and this value is stored as the current mam gain constant which is one of the four words stored in the memory. For the same column on the next scan line the starting value of $S_{2,i}$ is 1/16 and upon the next determination that $P_{n,i}$ is greater than the mean value "m" $S_{2,i}$ will decrease to the value of 1/32. The value of $S_{2,i}$ keeps decreasing in this 1/128 manner until it reaches a terminal value of 1/128. Throughout the remainder of the document $S_{2,i}$ has the value of 1/128.

In brief summary, as scanning takes place and the digitized information obtained from scanning is processed, each column of the twenty-seven columns across document 10 has a continuously updated value of the mean value "m" and the mean-above-mean value "mam", the current mean gain constant $S_{1,i}$ and the current mam gain constant $S_{2,i}$ stored in the four binary words in memory associated with each of the twenty-seven columns. The mean value "m" is used as described to decide if the mean-above-mean or mean peak value "mam" should be updated as previously described. The "mam" values for each of the twenty-seven columns are used to derive our adaptive threshold used in processing the digitized signal samples derived from scanning document 10 as now described. Equation (C) immediately herein below is utilized to calculate the adaptive threshold value $TH_{n,i}$.

$$Th_{n,i} = K(\tfrac{1}{4} mam_{n,i-1} + \tfrac{1}{2} mam_{n,i} + \tfrac{1}{4} mam_{n,i+1}) \tag{C}$$

Equation (C) has a constant k that does not vary automatically but may be manually varied by the operator of the facsimile equipment or other equipment in which our invention is utilized. K has a nominal value of 0.75 that may be manually varied over a range of 0.60 to 0.90 to either lighten or darken the document transmitted and recreated utilizing the facsimile process.

Equation (C) utilizes the values for mam for three contiguous columns on document 10. By utilizing the specified portion of the values of mam for a particular column and the particular columns immediately proceeding and succeeding the column of interest a filtering takes place such that the threshold value does not change radically from column to column across a document. There are two special cases at the beginning of a scan line and at the end of a scan line for the first and the twenty-seventh column across a document. For column one the threshold value is equal to the constant k times the sum of ½ the mam value for column one plus ½ the mam value for column two. In a similar manner, for column twenty-seven the threshold value is equal to the constant k times the sum of ½ times the mam value for column twenty-six plus ½ mam value of column twenty-seven. The threshold value for a column is calculated immediately preceeding the arrival of the binary number for the first of the sixty-four samples or pixels for each column. The threshold value is thereafter compared to the reflectance value $P_{n,i}$ for each of the sixty-four samples by comparator 17 in FIG. 1. When the threshold value is greater than the value of $P_{n,i}$ it is determined that the sample is black and a zero is generated. Conversely when the threshold value is less than or equal to the value of $P_{n,I}$ the sample is determined to be white and the signal a binary one is generated. Thus, a stream of zeros and ones is generated representing the document and this stream of zeros and ones is the processed digitized image signal.

Looking at FIG. 1 we see how this processed digitized image signal is generated. The digitized value of reflectance $P_{n,i}$ is a binary number placed in buffer 15 and then applied to a first of the two inputs of comparator 16. As $P_{n,i}$ for each of the sixty-four samples for each column is generated it is sequentially applied to this first input of comparator 16. During the time that these sixty-four digitized samples are being applied to the first input of comparator 16 microprocessor 19 has previously determined the threshold value for the column and applies this value in binary form via leads 22 to buffer 24 to then be applied to a second input of comparator 16. As a result of the comparison, the zeros and ones generated are output on lead 23 and via output circuit 21 for transmission to a remote location to reconstruct the document.

What has been described hereinabove is the preferred embodiment of our invention. It will be obvious to those skilled in the art that numerous changes may be made thereto without departing from the spilit and scope of the invention. For example, more than eight samples per column may be taken and utilized in the calculations described in the specification and more or less than twenty-seven columns may be utilized. In addition, the values of the constants may be changed to suit particular applications. Further, the exact averaging techniques utilized may vary from those taught in equations (A), (B) and (C).

What we claim is:

1. A thresholding digital imaging process comprising:
providing signals representing the optical density of the pixels of a document generated during a line-by-line scan of the document;
grouping said pixels into a plurality of columns, each column having a multiple pixel width;
deriving threshold values for each column during each scan line by adding a portion of an average of the optical density of the column to a portion of the average of the optical densities of contiguous columns; and
comparing the optical density of each pixel to a derived threshold value for the column to which the pixel being compared is encompassed and assigning a first output binary number value when the threshold value exceeds the optical density and assigning a second output binary number value when the threshold value is less than or equal to the optical density.

2. A thresholding digital imaging process comprising:
providing signals representing the optical density of the pixels of a document generated during a line-by-line scan of the document;
grouping said pixels into a plurality of columns, each column having a multiple pixel width;
deriving and storing the each column a mean peak value for the optical density of the pixels encompassed therein;
at predetermined pixel test locations, deriving and storing threshold values for each column during each scan line at each pixel test location by adding a portion of the stored mean peak value of the column to a portion of the stored mean peak values of contiguous columns; and
comparing the optical density of each pixel to the stored thrshold value for the column to which the pixel being compared is encompassed and assigning a first output binary number value when the threshold value exceeds said optical density and assigning a second output binary number value when the threshold value is less than or equal to the optical density.

3. A thresholding digital image process comprising:
providing signals representing the optical density of the pixels of a document generated during a line-by-line scan of the document;
grouping said pixels into a plurality of columns, each column having a multiple pixel width;
deriving and storing for each column in the initial scan line an initial mean peak value for the optical density of the pixels encompassed therein;
updating the stored mean peak value at predetermined pixel test locations by adding to the stored mean peak value, a portion of the difference between the optical density of the pixel at the current pixel test location in the column and the stored mean peak value of the pixel at the pixel test location immediately preceding the current pixel test location, to the mean peak value of the pixel at the pixel test location immediately preceding the current pixel test location;
at each pixel test location, deriving and storing threshold values for each column during each scan line at each predetermined pixel test location by adding a portion of the stored mean peak value of the column to a portion of the sotred mean peak values of contiguous columns; and comparing the optical density of each pixel to the stored threshold value for the column to which the pixel being compared is encompassed and assigning a first output binary number value when the threshold value exceeds said optical density and assigning a second output binary number value when the threshold value is less than or equal to the optical density.

4. The thresholding digital imaging process in claim 3 further comprising:

deriving and storing for each column in the initial scan line an initial mean value for the optical density of the pixels encompassed therein;

during each scan line, updating the stored mean value at predetermined pixel test locations only when the optical density of the pixel at the current pixel test location exceeds the stored mean value by adding to the stored mean peak value a portion of the difference between the optical density of the pixel at the current pixel test location in the column and the stored mean peak value of the pixel at the pixel test location immediately preceding the current pixel test location, to the mean peak value of the pixel at the pixel test location immediately preceding the current pixel test location.

5. The thresholding digital imaging process in claim 2 wherein the deriving of said mean peak values further comprises:

filtering the optical densities at each pixel test location with a one pole digital filter having unity gain and a given bandwidth.

6. The thresholding digital imaging process in claim 3 wherein the deriving of said mean peak values further comprises:

filtering the optical densities at each pixel test location with a one pole digital filter having unity gain and a given bandwidth.

7. The thresholding digital imaging process in claim 4 wherein the deriving the said mean peak values and said means values further comprises:

filtering the optical densities at each pixel test location with a one pole digital filter having unity gain and a given bandwidth.

* * * * *